United States Patent
Lanzon et al.

(10) Patent No.: US 6,402,654 B1
(45) Date of Patent: Jun. 11, 2002

(54) COMPACT MULTI-SPEED AUTOMATIC TRANSMISSION WITH LOAD SHARING AND ANTI-PHASE GEAR ASSEMBLY

(75) Inventors: James L. Lanzon, Fenton, MI (US); Richard Mizon, Fayetteville, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/653,187

(22) Filed: Aug. 31, 2000

Related U.S. Application Data

(63) Continuation-in-part of application No. 09/363,561, filed on Jul. 29, 1999, now Pat. No. 6,117,036.

(51) Int. Cl.[7] ............................................. F16H 37/08
(52) U.S. Cl. ........................ 475/204; 475/205; 74/410
(58) Field of Search ............................. 475/204, 205; 74/409, 410

(56) References Cited

U.S. PATENT DOCUMENTS

| | | | |
|---|---|---|---|
| 1,786,408 A | 12/1930 | Peterson | |
| 2,905,007 A | 9/1959 | Carlsen | |
| 3,359,819 A | 12/1967 | Veillette et al. | |
| 3,881,444 A | 5/1975 | Sigg | 115/37 |
| 4,036,074 A | 7/1977 | Bodnar | 74/409 |
| 4,513,637 A * | 4/1985 | Hirt | 74/801 |
| 4,612,816 A | 9/1986 | Chalik | 74/401 |
| 4,650,202 A * | 3/1987 | Tsuzuki | 280/248 |
| 4,677,873 A | 7/1987 | East | 74/665 GE |
| 4,690,009 A | 9/1987 | Rakhit et al. | 74/409 |
| 4,747,321 A | 5/1988 | Hannel | 74/440 |
| 4,805,475 A | 2/1989 | Hannel | 74/440 |
| 5,088,970 A * | 2/1992 | Dye | 475/227 |
| 5,181,433 A | 1/1993 | Ueno et al. | 74/409 |
| 5,397,282 A | 3/1995 | Weidman | 475/205 |
| 5,400,672 A | 3/1995 | Bunch, Jr. | 74/409 |
| 5,427,580 A | 6/1995 | Ledvina et al. | 474/84 |
| 5,472,383 A | 12/1995 | McKibbin | 475/159 |
| 5,573,063 A | 11/1996 | Morrow | 166/68.5 |
| 5,593,358 A | 1/1997 | Frost | 475/218 |
| 5,728,022 A * | 3/1998 | Schultz | 475/205 |
| 5,927,147 A | 7/1999 | Morrow | 74/410 |
| 5,957,804 A | 9/1999 | Schultz et al. | 475/331 |
| 6,117,036 A * | 9/2000 | Lanzon et al. | 475/204 |

FOREIGN PATENT DOCUMENTS

| | | |
|---|---|---|
| DE | 3801461 | 8/1989 |
| DE | 3803700 | 8/1989 |
| DK | 3803-700 A | 2/1988 |
| DK | 3801-461 A | 8/1989 |

(List continued on next page.)

*Primary Examiner*—Sherry Estremsky
*Assistant Examiner*—Tisha D. Lewis
(74) *Attorney, Agent, or Firm*—Harness, Dickey & Pierce P.L.C.

(57) ABSTRACT

A split planetary gear assembly is provided having a pair of helical gearsets implemented in a vehicle transmission. The first helical gearset includes a first sun gear, a first ring gear, and a set of first planet gears meshed with the first sun gear and the first ring gear. The second helical gearset includes a second sun gear, a second ring gear, and a set of second planet gears meshed with the second sun gear and the second ring gear. The components of the second helical gearset have the same number of teeth, helix angle, and tooth pitch as the components of the first helical gearset with the exceptions that their angular helix orientation (i.e., left-hand/right-hand) is reversed and they are circumferentially indexed by one-half tooth pitch. In addition, the first and second planet gears are arranged in paired sets and supported on a common pinion shaft which, in turn, is fixed to a planet carrier. The second sun gear is splined for rotation with and limited axial movement relative to the first sun gear. A plurality of split planetary gear assemblies are interconnected and components of each assembly are selectively braked or clutched for establishing numerous forward drive ratios and a reverse ratio.

16 Claims, 12 Drawing Sheets

FOREIGN PATENT DOCUMENTS

| | | |
|---|---|---|
| EP | 0424147 A2 | 4/1991 |
| GB | 334668 | 9/1930 |
| JP | 61-266870 | 11/1986 |
| JP | 62-113961 | 5/1987 |
| JP | 63-152769 | 6/1988 |
| JP | 3-37466 | 2/1991 |
| JP | 0 424 147 A2 | 4/1991 |
| SU | 1546753 | 2/1990 |
| SU | 1546753 A1 | 2/1990 |
| WO | WO 97/18407 | 5/1997 |

* cited by examiner

COMPACT MULTI-SPEED AUTOMATIC TRANSMISSION WITH LOAD SHARING AND ANTI-PHASE GEAR ASSEMBLY

CROSS-REFERENCE TO RELATED APPLICATION

This is a continuation-in-part of U.S. Ser. No. 09/363,561, filed on Jul. 29, 1999 now U.S. Pat. No. 6,117,036.

FIELD OF THE INVENTION

The present invention relates generally to transmissions and more particularly to improved transmissions having split planetary gear assemblies with load sharing and anti-phase technology.

DESCRIPTION OF THE BACKGROUND ART

Automobile manufacturers continuously seek to improve performance and reduce weight of vehicles through innovative design and technology implementation. One key area for such improvement is the powertrain, including transmissions and transfer cases. Automobile manufacturers seek to improve the noise, vibration and harshness (NVH) characteristics of a vehicle powertrain to improve overall occupant comfort. Additionally, improvements in size and weight of powertrain components is desired to decrease cost, increase fuel efficiency and provide better packaging underneath a vehicle.

Vehicle transmissions selectively transfer the power and rotational motion of an engine output through varying gear ratios. As such, speed and power to a vehicle driveline can be controlled by each of the gear ratios. As is known in the art, planetary gear assemblies can be interconnected in such a manner as to enable selection of one of a plurality of drive ratios. Planetary gear type-transmissions are available in both manual and automatic varieties. An example of such a planetary-type transmission is shown in commonly-owned U.S. Pat. No. 5,593,358.

Many light-duty trucks and sport-utility vehicles are equipped with a transfer case for providing a four-wheel drive mode of operation. To accommodate differing road surfaces and conditions, many transfer cases are equipped with a gear reduction unit that can be selectively shifted by the vehicle operator to establish high-range (i.e., direct drive) and low-range (i.e., reduced ratio drive) four-wheel drive modes. While layshaft-type gear reduction units are available, most transfer cases are now equipped with a planetary-type gear reduction unit due to improved efficiency and reduced size requirements. An example of such a planetary-type reduction unit installed in a four-wheel drive transfer case is shown in commonly-owned U.S. Pat. No. 4,770,280.

Due to inherent noise associated with spur gears, many planetary-type gear assemblies utilize helical gearing to provide quieter operation. However, a recognized design constraint associated with helical planetary gearsets is the opposing lateral thrust loads generated by the helix angle of the sun gear and ring gear that must be contained. Moreover, it is desirable to allow the helical gearing to be self-centering for optimized sharing of the gear loads which may result in further improvements in durability and noise reduction. In the gear industry, it is known that herringbone gears can be used to address the thrust loading associated with conventional helical gearing. Herringbone gears, however, are difficult and costly to manufacture and, as such, have limited application to vehicular drivetrain products. As such, a need exists to develop planetary gear assemblies which advance the art and address the shortcomings of conventional planetary gear assemblies implemented in vehicle transmission.

It is an object of the present invention to improve the NVH characteristics of planetary-type vehicle transmissions. It is another object of the present invention to reduce the size and weight of planetary-type vehicle transmissions.

It is yet a further object of the present invention to provide an improved gear reduction unit for use with electric or hybrid vehicles.

SUMMARY OF THE INVENTION

In achieving the above described objects, the present invention is directed to a split planetary gear assembly having a pair of helical gearsets. The first helical gearset includes a first sun gear, a first ring gear, and a set of first planet gears meshed with the first sun gear and the first ring gear. The second helical gearset includes a second sun gear, a second ring gear, and a set of second planet gears meshed with the second sun gear and the second ring gear. The components of the second helical gearset have the same number of teeth, helix angle, and tooth pitch as the components of the first helical gearset with the exceptions that their angular helix orientation is reversed and they are circumferentially indexed by one-half tooth pitch. In addition, the first and second planet gears are arranged in paired sets and supported on a common pinion shaft which, in turn, is fixed to a planet carrier. The second sun gear is splined for common rotation with and limited axial movement relative to the first sun gear.

In a preferred arrangement, the first and second helical gearsets are juxtapositioned with the first and second ring gears non-rotatably fixed to a stationary housing and rotary power being supplied from an input member to the first sun gear. A clutch sleeve is splined to an output member and is axially moveable thereon between a first position and a second position. With the clutch sleeve in its first position, it couples the output member to the second sun gear for establishing a first drive connection with the input member. With the clutch sleeve in its second position, it couples the output member to the planet carrier for establishing a second drive connection with the input member.

In accordance with a first preferred embodiment of the present invention, at least one split planetary gear assembly is installed in a transmission to provide a plurality of forward drive ratios and a reverse ratio.

BRIEF DESCRIPTION OF THE DRAWINGS

The present invention will become more fully understood from the detailed description given hereinbelow and the drawings which are given for purposes of illustration only and thus are not limitative of the present invention, and wherein.

DETAILED DESCRIPTION OF THE PREFERRED EMBODIMENT

In general, the present invention is directed to a two-speed planetary-type gear reduction unit operable for establishing two distinct speed ratio drive connections between an input member and an output member. More specifically, the gear reduction unit is a split planetary gear assembly including a first helical gearset having its gear components oppositely angled and circumferentially index or "phased" relative to the gear components of a second helical gearset. The planetary gear assembly of the present invention is particularly well-suited for use in a two-speed transfer case of the type used in four-wheel drive vehicles in conjunction with a range shift system to permit selective shifting between high-range and low-range drive modes. Additionally, the planetary gear assembly of the present invention is well-suited for use in transmissions which provide a plurality of drive ratios.

Figure 1:
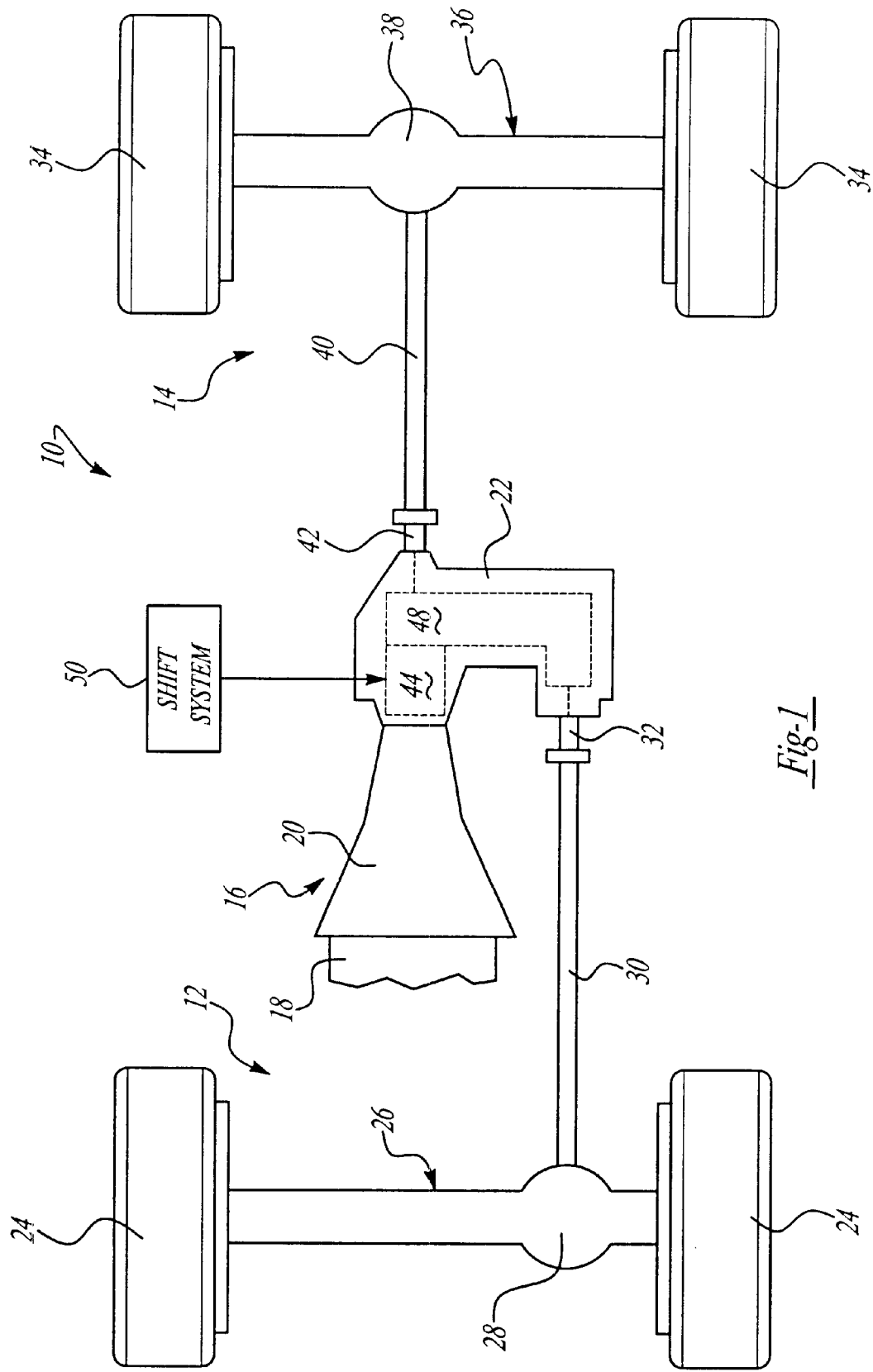
FIG. 1 is a schematic view of the drivetrain for a four-wheel drive vehicle having transfer case equipped with a gear reduction unit embodying a split planetary gear assembly according to the present invention.

Referring to FIG. 1, a drivetrain 10 for use in a four-wheel drive motor vehicle is shown to include a front driveline 12, a rear driveline 14, and a powertrain 16 for supplying rotary power to the drivelines. Powertrain 16 includes an engine 18, a multi-speed transmission 20, and a transfer case 22. Front driveline 12 includes front wheels 24 connected to axleshafts of a front axle assembly 26 having a front differential 28 that is coupled to one end of a front propshaft 30, the opposite end of which is coupled to a front output shaft 32 of transfer case 22. Similarly, rear driveline 14 includes rear wheels 34 connected to axleshafts of a rear axle assembly 36 having a rear differential 38 coupled to one end of a rear propshaft 40, the opposite end of which is interconnected to a rear output shaft 42 of transfer case 22.

In operation, transfer case 22 functions to transfer drive torque from transmission 20 to one or both of the drivelines. In this regard, transfer case 22 includes a gear reduction unit 44 for permitting selective establishment of two distinct speed ratio drive connections between the output of transmission 20 and rear output shaft 2. In addition, transfer case 22 is equipped with a torque transfer mechanism 48 for permitting drive torque to be transferred from rear output shaft 42 to front output shaft 32 to establish a four-wheel drive mode of operation. Typically, torque transfer mechanism 48 includes a drive sprocket supported on rear output shaft 42, a driven sprocket fixed to front output shaft 32, and a power chain interconnecting the drive and driven sprockets. In addition, torque transfer mechanism 48 includes a coupling unit for selectively (part-time 4WD systems), automatically (on-demand 4WD systems), and/or continuously (full-time AWD systems) transferring power to the drive sprocket for supplying drive torque to front driveline 12. For example, commonly-owned U.S. Pat. No. 4,770,280 shows the coupling unit as a synchronized mode shift system in a part-time 4WD transfer case, commonly owned U.S. Pat. No. 5,704,863 shows the coupling unit as a hydromechanical coupling in an on-demand 4WD transfer case, commonly-owned U.S. Pat. No. 5,363,938 shows the coupling unit as a mechanically-actuated clutch pack in another on-demand 4WD transfer case, and commonly-owned U.S. Pat. No. 4,677,873 shows the coupling unit as an interaxle differential in a full-time 4WD transfer case. These exemplary coupling units are illustrative of the numerous arrangements known in the four-wheel drive art and in no way are they intended to limit the present invention. Finally, drivetrain 10 is shown to further include a shift system 50 for permitting selective control over operation of gear reduction unit 44 and possibly actuation of the coupling unit.

Figure 2:
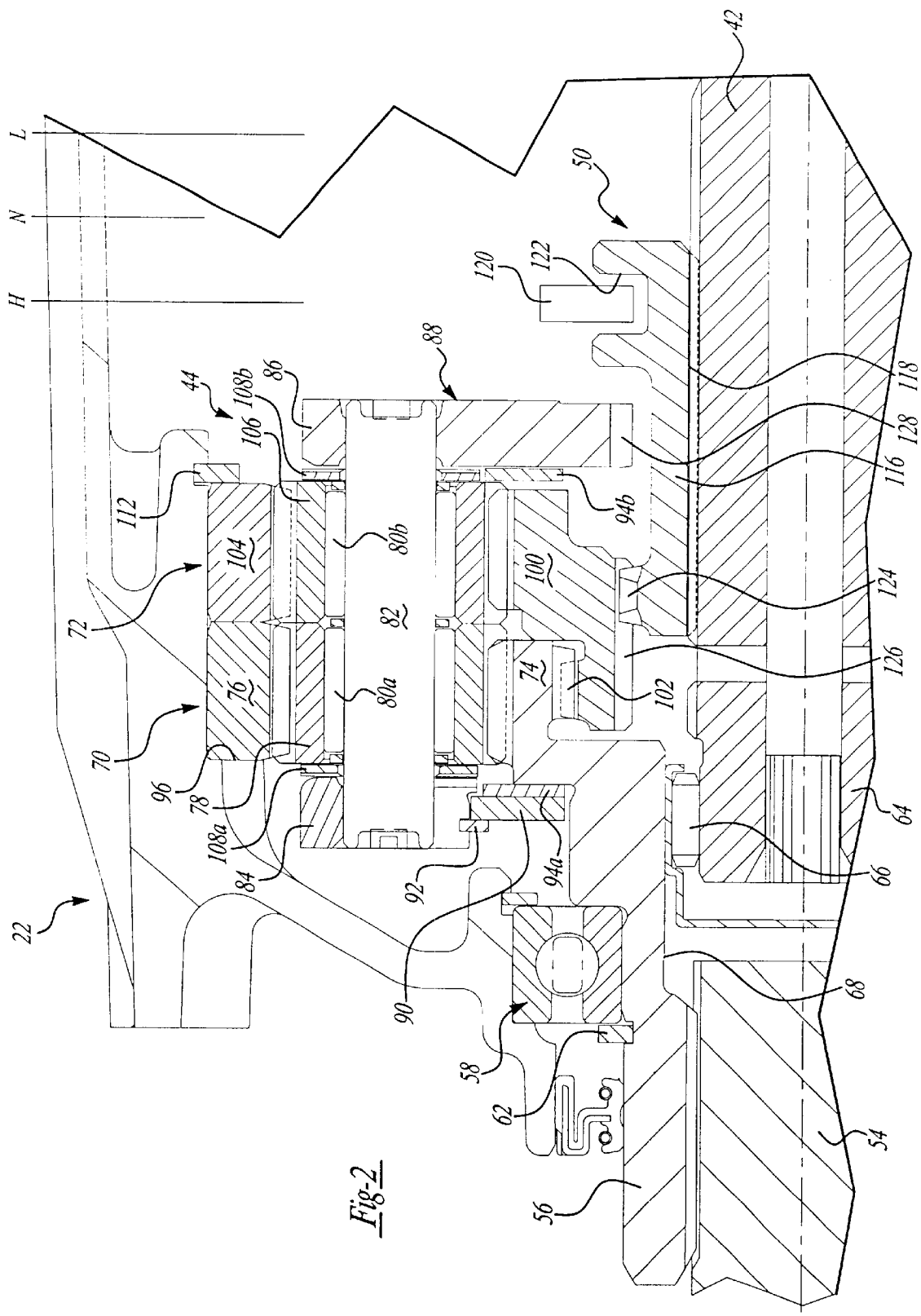
FIG. 2 is a partial sectional view of the transfer case showing details of the split planetary gear assembly.

Referring now to FIG. 2, a portion of transfer case 22 is shown to illustrate the components associated with gear reduction unit 44. A housing 52 of transfer case 22 receives a transmission output shaft 54 that is coupled (i.e., splined) to a transfer case input shaft 56. A bearing assembly 58 axially locates and supports input shaft 56 for rotation in housing 52. As seen, an outer race of bearing assembly 58 bears against a radial shoulder surface of housing 52 and is axially restrained by a snap ring 60. Likewise, an inner race of bearing assembly 58 abuts against a radial shoulder surface of input shaft 56 and is axially restrained by a snap ring 62. A pilot segment 64 of rear output shaft 42 is shown rotatably supported by a bearing assembly 66 in a pilot bore 68 formed in input shaft 56. Gear reduction unit 44 is operably installed between input shaft 56 and rear output shaft 42. Thus, input shaft 56 acts as an input member for driving gear reduction unit 44 while rear output shaft 42 acts as an output member which can be selectively coupled to either of two different rotary components of gear reduction unit 44.

According to the present invention, gear reduction unit 44 is a split planetary gear assembly comprised of a first helical planetary gearset 70 and a second helical planetary gearset 72 arranged in a side-by-side orientation. First gearset 70 includes a first sun gear 74 fixed for rotation with input shaft 56, a first ring gear 76 non-rotatably fixed to housing 52, and a set of first planet gears 78 that are meshed with first sun gear 74 and first ring gear 76. Each first planet gear 78 is rotatably supported by a bearing assembly 80a on a pinion shaft 82 having its opposite ends retained in front and rear carrier plates 84 and 86, respectively, which are interconnected to define a planet carrier 88. Pinion shafts 82 are equally-spaced and circumferentially arranged with respect to planet carrier 88. A retainer plate 90 is secured via a snap ring 92 to front carrier plate 84 and a first bearing plate 94a is disposed between retainer plate 90 and first sun gear 74 to accommodate relative rotation therebetween. First ring gear 76 is splined or keyed to housing 52 for non-rotatably securing first ring gear 76 thereto. In addition, a face surface of first ring gear 76 is retained against a radial stop shoulder 96 formed in housing 52.

Second helical planetary gearset 72 includes a second sun gear 100 fixed via a splined connection 102 for rotation with first sun gear 74, a second ring gear 104 non-rotatably fixed to housing 52, and a set of second planet gears 106 that are each meshed with second sun gear 100 and second ring gear 104. Each second planet gear 106 is rotatably supported by a bearing assembly 80b on pinion shaft 82 directly adjacent to a corresponding first planet gear 78. Suitable thrust washers 108a and 108b are disposed between planet gears 78 and 106 and the corresponding carrier plates 84 and 86. A second bearing plate 94b is disposed between second sun gear 100 and rear carrier plate 86 to accommodate relative rotation therebetween. In a manner similar to first ring gear 76, second ring gear 104 is splined or keyed to housing 52 for non-rotatably securing second ring gear 104 thereto. A snap ring 112 restrains ring gears 76 and 104 against axial movement.

Figure 3:
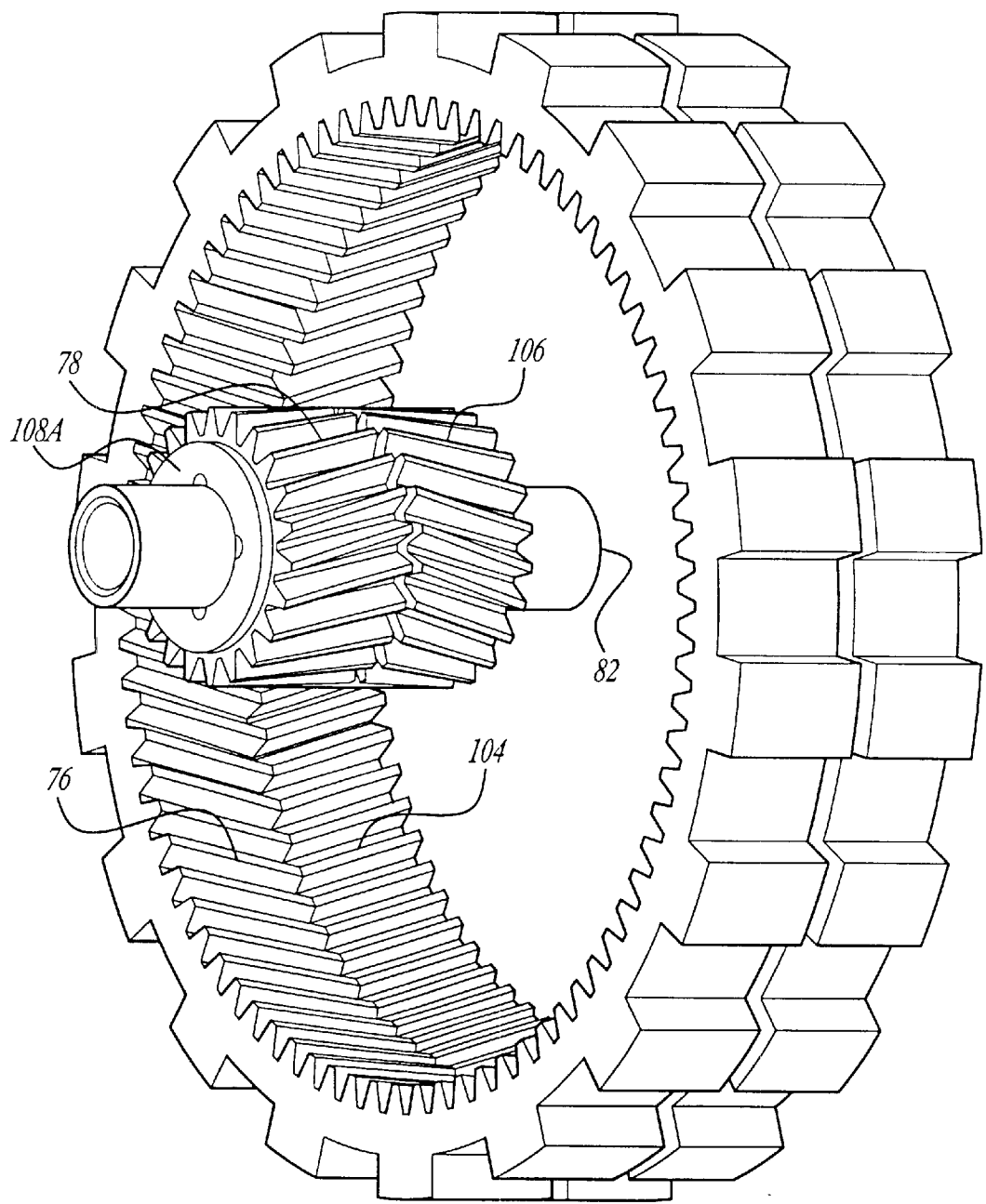
FIG. 3 is a pictorial view showing components of the split planetary gear assembly.

In accordance with the present invention, the helical gear components of second planetary gearset 72 have the same number of teeth, helix angle and tooth pitch as the corresponding helical gear components of first planetary gearset 70. However, the angular helix orientation (i.e., left-hand or right-hand) of the helical gear components of secondary planetary gearset 72 are reversed with respect to the corresponding helical gear components of first planetary gearset 70 and they are circumferentially phased or "indexed" by one-half tooth pitch. For example, if the helix orientation is right-handed for first sun gear 74, then the helix orientation is left-handed for second sun gear 100. Plus, the helical gear teeth of second sun gear 100 are circumferentially indexed by one-half tooth pitch relative to the helical gear teeth of first sun gear 74. A similar one-half tooth pitch indexing is provided between first ring gear 76 and second ring gear 104 as well as between each pair of commonly-aligned first and second planet gears 78 and 106. As such, equal and opposite axial thrust forces will be generated for substantially minimizing or eliminating the "net" thrust forces ultimately transferred to housing 52. These reverse angular inclination and circumferential indexing features are clearly shown in FIG. 3. Moreover, the splined connection 102 between sun gears 74 and 100 functions to permit limited axial translation of second sun gear 100 relative to first sun gear 74 so as to promote improved balancing of the gear loads. Furthermore, planet carrier 88 is free to float radially for negating unbalanced torque loads.

With continued reference to FIG. 2, shift system 50 is shown to include a range sleeve 116 which is fixed via a splined connection 118 to rear output shaft 42 for rotation therewith. Range sleeve 116 is axially movable relative to rear output shaft 42 between a high-range position (position line "H"), a neutral position (position line "N"), and a low-range position (position line "L") for establishing corresponding drive connections between input shaft 56 and rear output shaft 42. As seen, a portion of a range fork 120 is nested in an annular groove 122 formed in range sleeve 116. As is conventional, range fork 120 is operably connected to a shift actuator associated with shift system 50 for causing manually-actuated or power-operated movement of range sleeve 116 to one of the three distinct range positions. Range sleeve 116 includes external clutch teeth 124 that are selectively engageable with internal clutch teeth 126 formed on second sun gear 100 when range sleeve 116 is in its high-range position (as shown). With range sleeve 116 in its high-range position, a direct drive connection is established between input shaft 56 and rear output shaft 42 to define a high-range drive mode for transfer case 22. Likewise, clutch teeth 124 are selectively engageable with internal clutch teeth 128 formed on rear carrier plate 86 when range sleeve 116 is in its low-range position, whereby a reduced ratio drive connection is established between input shaft 56 and rear output shaft 42 for defining a low-range drive mode.

Finally, a neutral mode is established when range sleeve 116 is located in the neutral position whereat its clutch teeth 124 are disengaged from clutch teeth 126 on second sun gear 100 and clutch teeth 128 on rear carrier plate 86.

Figure 4:
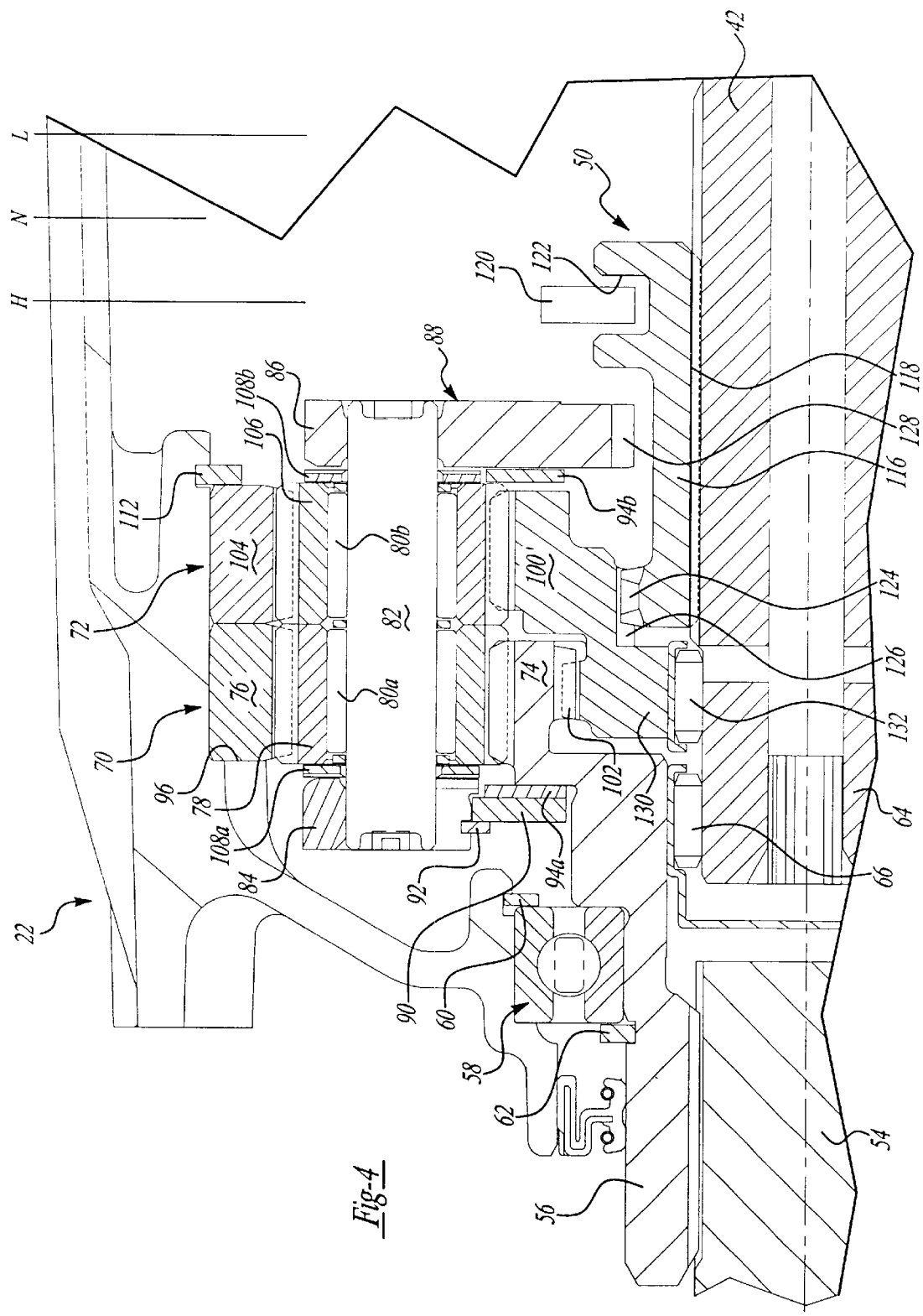
FIGS. 4 and 5 are sectional views, similar to FIG. 2, showing modified constructions for the split planetary gear assembly of the present invention.
Figure 5:
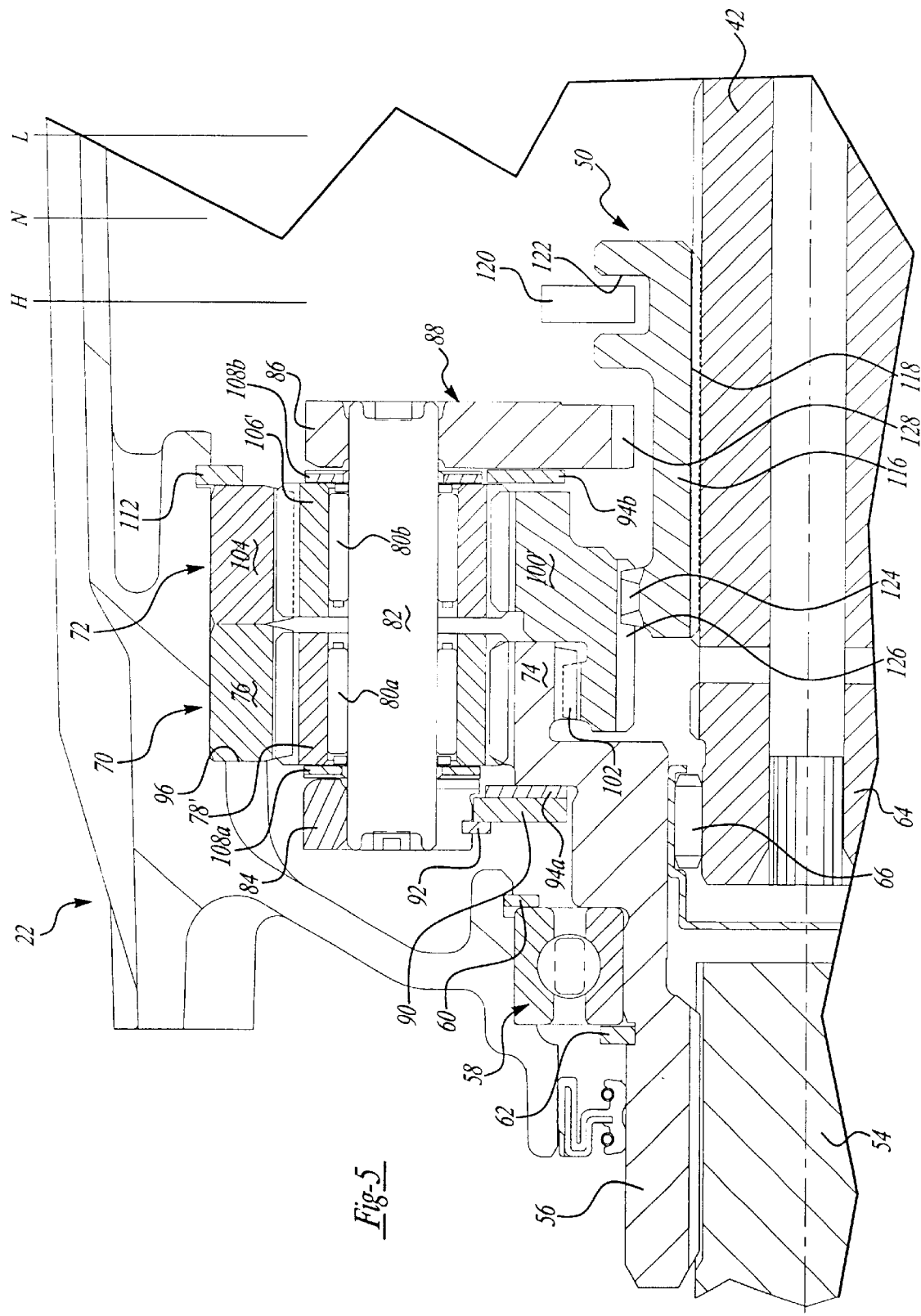

Referring now to FIG. 4, a modified version of gear reduction unit 44 is shown. This construction is generally identical to that shown in FIG. 2 with the exception that second sun gear 100' now includes a radial hub segment 130 that is journalled by a suitable bushing or bearing assembly 132 on pilot segment 64 of rear output shaft 42 for axial sliding movement relative thereto. This hub feature is provided to reduce the radial play of second sun gear 100'. In a similar manner, FIG. 5 illustrates a modified version of the construction shown in FIG. 2 wherein planet gears 78' and 106' have a reduced thickness so as to define an axial gap therebetween. Thus, the matched pairs of planet gears 78' and 106' are free to move axially through a limited range of travel on pinion shafts 82 to provide a self-centering feature for balancing the gear loads.

Various advantages are provided in conjunction with the dual or split planetary gear assembly of the present invention when compared to traditional single helical gearsets. For example, the self-canceling of the thrust loads eliminates many of the design constraints associated with transferring and absorbing such thrust loads. In addition, the circumferential indexing acts to phase the excitation (i.e., noise) curves by canceling their frequencies, thereby resulting in reduced noise and vibration. Furthermore, the arrangement provides for improved balance of the meshed gear loads to permit a reduction in the overall gear precision required for comparable applications.

In light of these advantages, split planetary gear assemblies can be implemented in vehicle transmissions for providing a plurality of drive ratios. As such, NVH characteristics, size and weight of the transmission can be improved. With reference to FIGS. 6 through 11, a series of preferred embodiments of such a transmission are described in detail.

Figure 6:
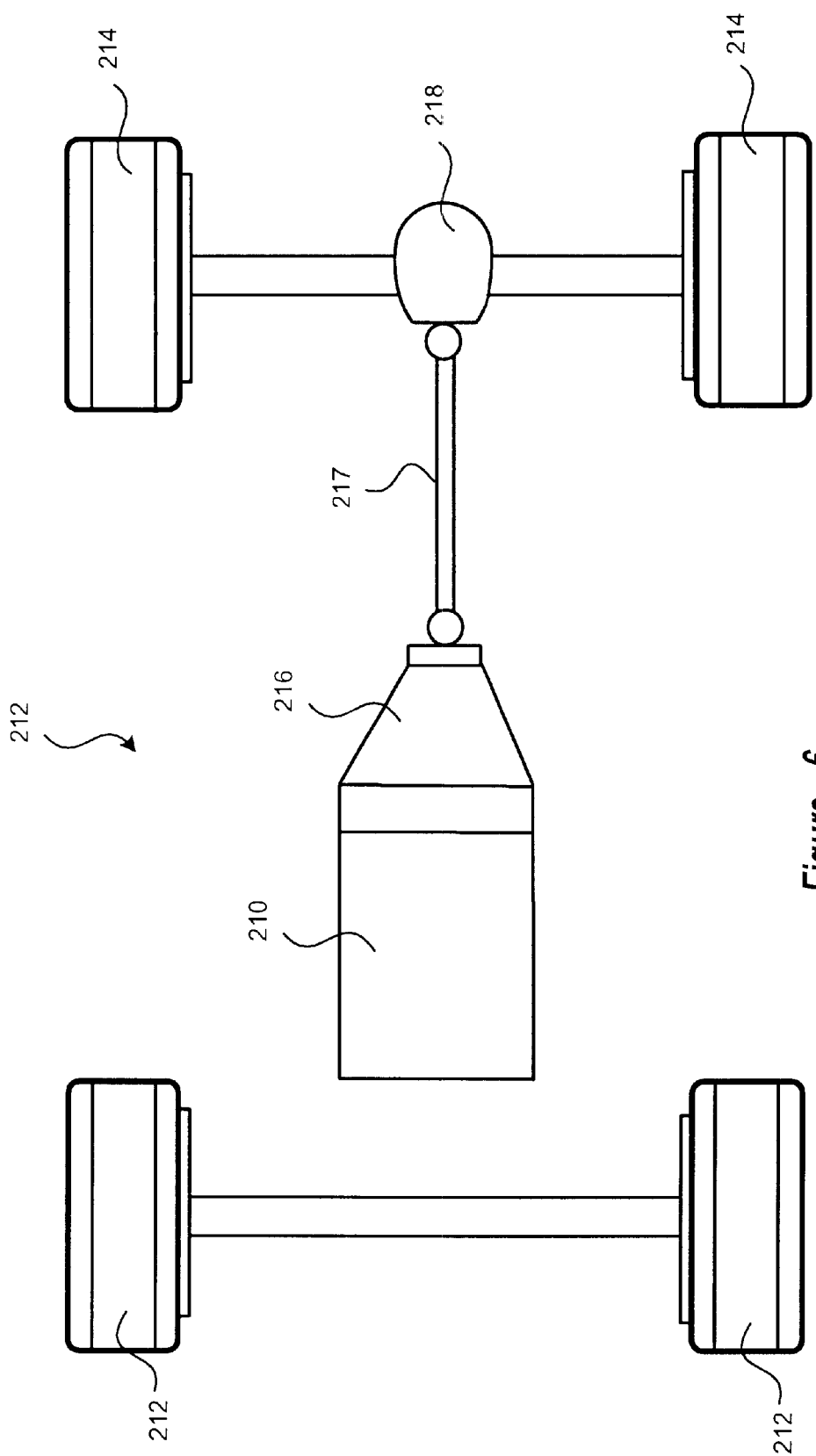
FIG. 6 is a schematic view of the drivetrain for a typical vehicle having a transmission equipped with at least one split planetary gear assembly according to the present invention.

FIG. 6 is a schematic view of a vehicle 200 comprising an engine 210, a front and rear pair of wheels 212, a transmission 216 and a differential 218. Transmission 216 is adapted to be driven by an output of engine 210. Differential 218 is adapted to be driven by an output of transmission 216 and in turn is adapted to drive rear wheels 214. It is anticipated, however, that transmission 216 can be adapted to drive front wheels 212 or include a transfer case (not shown) for driving both front and rear wheels 212 and 214, in a four-wheel drive configuration.

Figure 7:
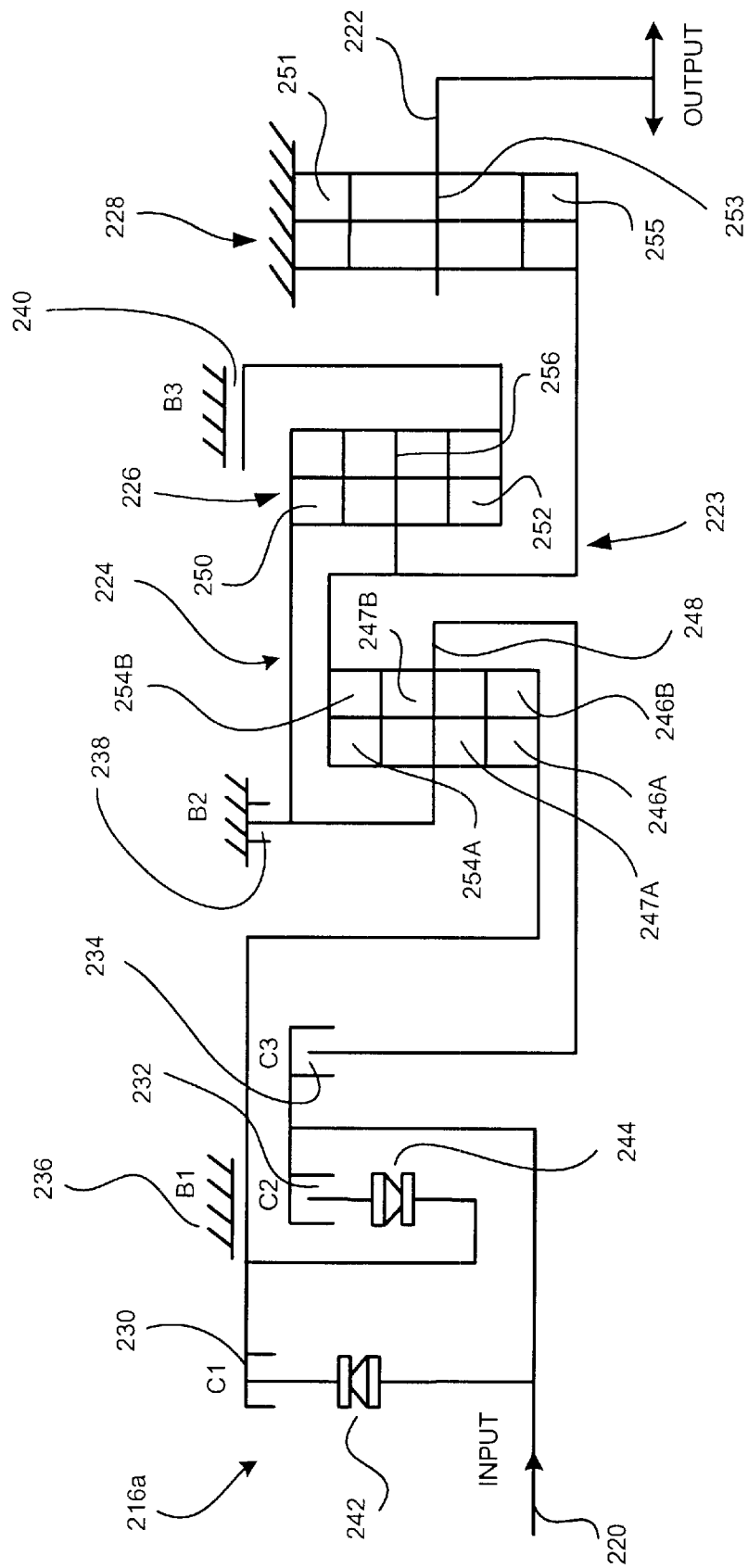
FIG. 7 is a schematic view of a four-speed transmission embodying multiple split planetary gear assemblies according to the principles of the present invention.

FIG. 7, is a schematic view of a first preferred embodiment of transmission 216, referenced as transmission 216a. Transmission 216a comprises an input shaft 220, an output shaft 222 and a geartrain 223 operatively interconnecting input shaft 220 to output shaft 222. Geartrain 223 includes a first planetary gear assembly 224, a second planetary gear assembly 226 and a third planetary gear assembly 228. Transmission 216a further includes a system for selectively actuating geartrain 223 for establishing various forward and reverse speed ratios. The system includes a first clutch 230, a second clutch 232, a third clutch 234, a first brake 236, a second brake 238, a third brake 240, a first one-way clutch 242 and a second one-way clutch 244. It is foreseeable that first, second and third clutches 230, 232, 234 are of the synchronizer type or, alternatively, of the multi-plate clutch type. Transmission 216a can establish four (4) forward driving ratios and a reverse ratio, by selectively engaging first, second and third clutches 230, 232, 234, as well as, first second and third brakes 236, 238, 240 in various pairs, as described below.

First planetary gear assembly 224 includes a sun gear 246, a ring gear 254 and a plurality of pinions 247 rotatably supported from a carrier 248 which are meshed with sun gear 246 and ring gear 254. First planetary gear assembly 224 is of the split-helical, anti-phased and load-sharing type similar to the arrangement disclosed previously with reference to FIGS. 2 through 5. Specifically, sun gear 246 is comprised of a pair of sun gears 246A and 246B, pinions 247 are comprised of a plurality of paired sets 247A and 247B, and ring gear 254 is comprised of a pair of ring gears 254A and 254B. The meshed combination of sun gear 246A, pinions 247A and ring gear 254A are anti-phased one-half tooth pitch relative to meshed combination of sun gear 246B, pinions 247B and ring gear 254B. As schematically shown, second planetary gear assembly 226 and third planetary gear assembly 228 are substantially identical to first planetary gear assembly 224. As such, it is not required that each be individually described in equivalent detail.

Input shaft 220 is driven by an output of engine 210. Input shaft 220 is in mechanical communication with first, second and third clutches 230, 232, 234. Engagement of first or second clutch 230, 232 couples input shaft 220 to first sun gear 246. Engagement of third clutch 234 couples input shaft 220 to carrier 248. First brake 236 can be selectively engaged for braking first sun gear 246, such that first sun gear 246 is prohibited from rotation. Second brake 238 can be selectively engaged for simultaneously braking carrier 248 and a ring gear 250 of second planetary gear assembly 226 such that carrier 248 and ring gear 250 are prohibited from rotation. Third brake 240 can be selectively engaged for braking a sun gear 252 of second planetary gear assembly 226. Both ring gear 254 of first planetary gear assembly 224 and carrier 256 of second planetary gear assembly 226 are in mechanical communication with output shaft 222 via third planetary gear assembly 228. It should be noted, however, that third planetary gear assembly 228 is optional, providing a further gear reduction for transmission 216a. Third planetary gear assembly comprises a ring gear 251, pinions 257 rotatably supported on a carrier 253, and a sun gear 255. Ring gear 251 is fixed to a non-moving interior structure (e.g. a transmission housing) such that it cannot rotate. Carrier 253 drives output shaft 222 and sun gear 255 is driven by ring gear 254 of first planetary gear assembly 224 or carrier 256 of second planetary gear assembly 226.

As described previously, various combinations of clutches and brakes are engaged for establishing four forward drive ratios and a reverse ratio. With particular reference to Table 1 below, the various gear ratios and clutch/brake combinations for establishing the gear ratios are defined. As shown, a first forward drive ratio is established by engaging first clutch (C1) 230 and third brake (B3) 240. A second forward drive ratio is established by engaging third clutch (C3) 234 and third brake (B3) 240. A third forward drive ratio is established by engaging second clutch (C2) 232 and third clutch (C3) 234. A fourth forward drive ratio is established by engaging third clutch (C3) 234 and first brake (B1) 236. A reverse drive ratio is established by engaging first clutch (C1) 230 and second brake (B2) 238.

TABLE 1

| Ratio | C1 | C2 | C3 | B1 | B2 | B3 |
|---|---|---|---|---|---|---|
| 1 | X | | | | | X |
| 2 | | | X | | | X |
| 3 | | X | X | | | |

TABLE 1-continued

| Ratio | C1 | C2 | C3 | B1 | B2 | B3 |
|---|---|---|---|---|---|---|
| 4 | | | X | X | | |
| R | X | | | | X | |

Figure 8:
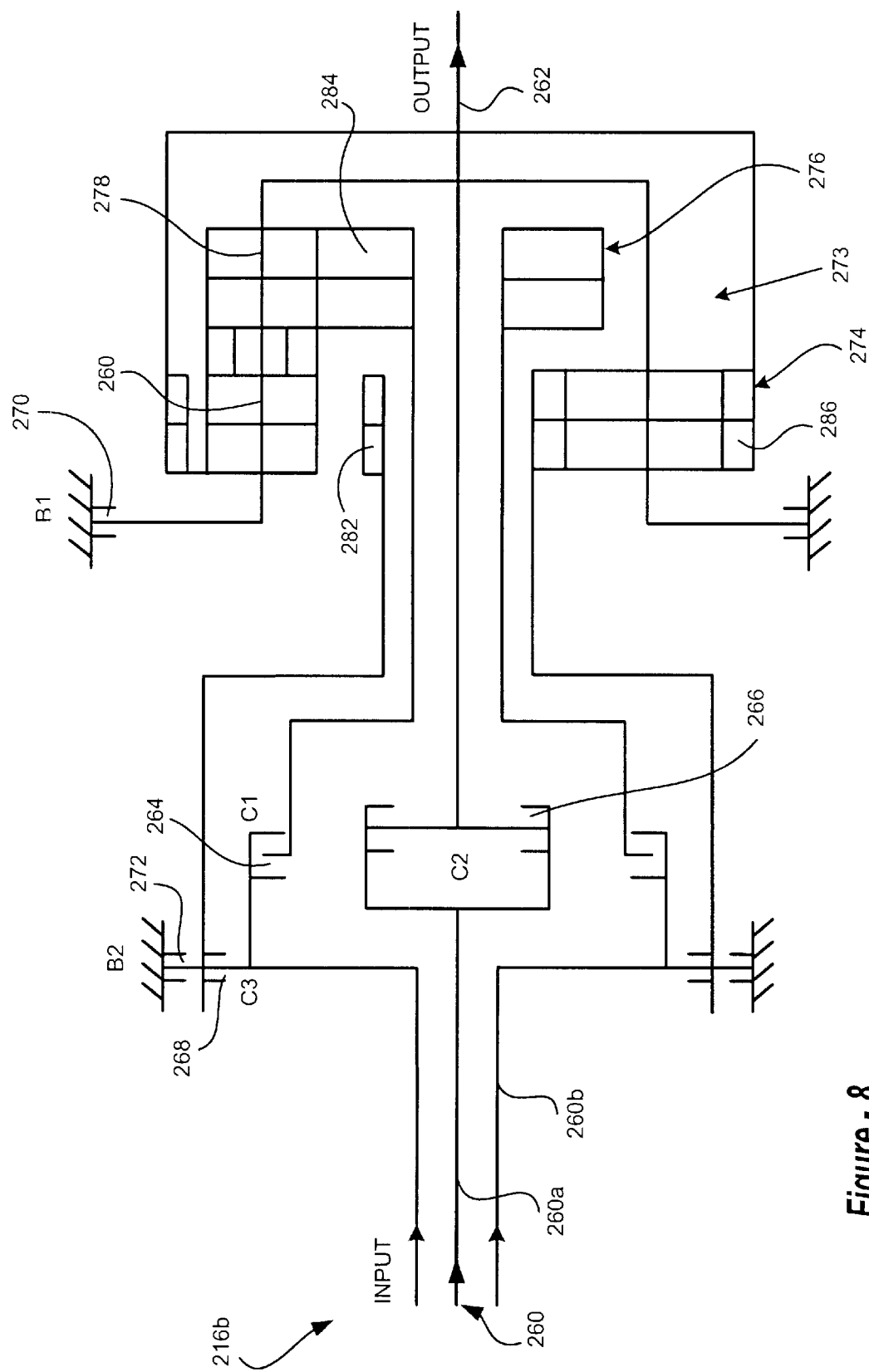
FIG. 8 is a schematic view of a Ravigneaux type four-speed transmission embodying multiple split planetary gear assemblies according to the principles of the present invention.

With particular reference to FIG. 8, a second preferred embodiment of transmission 216, referenced as transmission 216b, will be described in detail. Transmission 216b enables four (4) forward drive ratios and a reverse ratio and is of the Ravigneaux type, commonly known in the art. Transmission 216b comprises an input shaft 260, an output shaft 262, a first clutch 264, a second clutch 266 and a third clutch 268, a first brake 270 and a second brake 272, and a geartrain 273 including a first planetary gear assembly 274 and a second planetary gear assembly 276. As noted above, first and second planetary gear assemblies 274, 276 of the second preferred embodiment are split-helical planetary gear assemblies, implementing load sharing and anti-phase technology.

Input shaft 260 comprises a first shaft 260a and a second shaft 260b concentrically disposed around first shaft 260a. First shaft 260a is selectively in mechanical communication with a carrier 278 of second planetary gear assembly 276 through second clutch 266. A carrier 280 of first planetary gear assembly 274 is linked for rotation with carrier 278 of second planetary gear assembly 276. Second shaft 260b is selectively engagable with both sun gear 282 of first planetary gear assembly 274 and sun gear 284 of second planetary assembly 276 through first and third clutches 268 and 264, respectively. Second brake 272 can be selectively engaged for braking sun gear 282, prohibiting rotation of sun gear 282. First brake 270 can be selectively engaged for braking carriers 278, 280, prohibiting rotation of each. A ring gear 286 of first planetary gear assembly 274 is in mechanical communication with output shaft 262 for driving output shaft 262.

As described previously, various combinations of clutches and brakes are engaged for establishing four forward drive ratios and a reverse ratio. With particular reference to Table 2 below, the various gear ratios and clutch/brake combinations for establishing the gear ratios are defined. As shown, a first forward drive ratio is established by engaging first clutch (C1) 264 and first brake (B1) 270. A second forward drive ratio is established by engaging first clutch (C1) 264 and second brake (B2) 272. A third forward drive ratio is established by engaging first and third clutches (C1,C3) 264, 268. A fourth forward drive ratio is established by engaging second clutch (C2) 266 and second brake (B2) 272. A reverse drive ratio is established by engaging third clutch (C3) 268 and first brake (B1) 270.

TABLE 2

| Ratio | C1 | C2 | C3 | B1 | B2 |
|---|---|---|---|---|---|
| 1 | X | | | X | |
| 2 | X | | | | X |
| 3 | X | | X | | |
| 4 | | X | | | X |
| R | | | X | X | |

Figure 9:
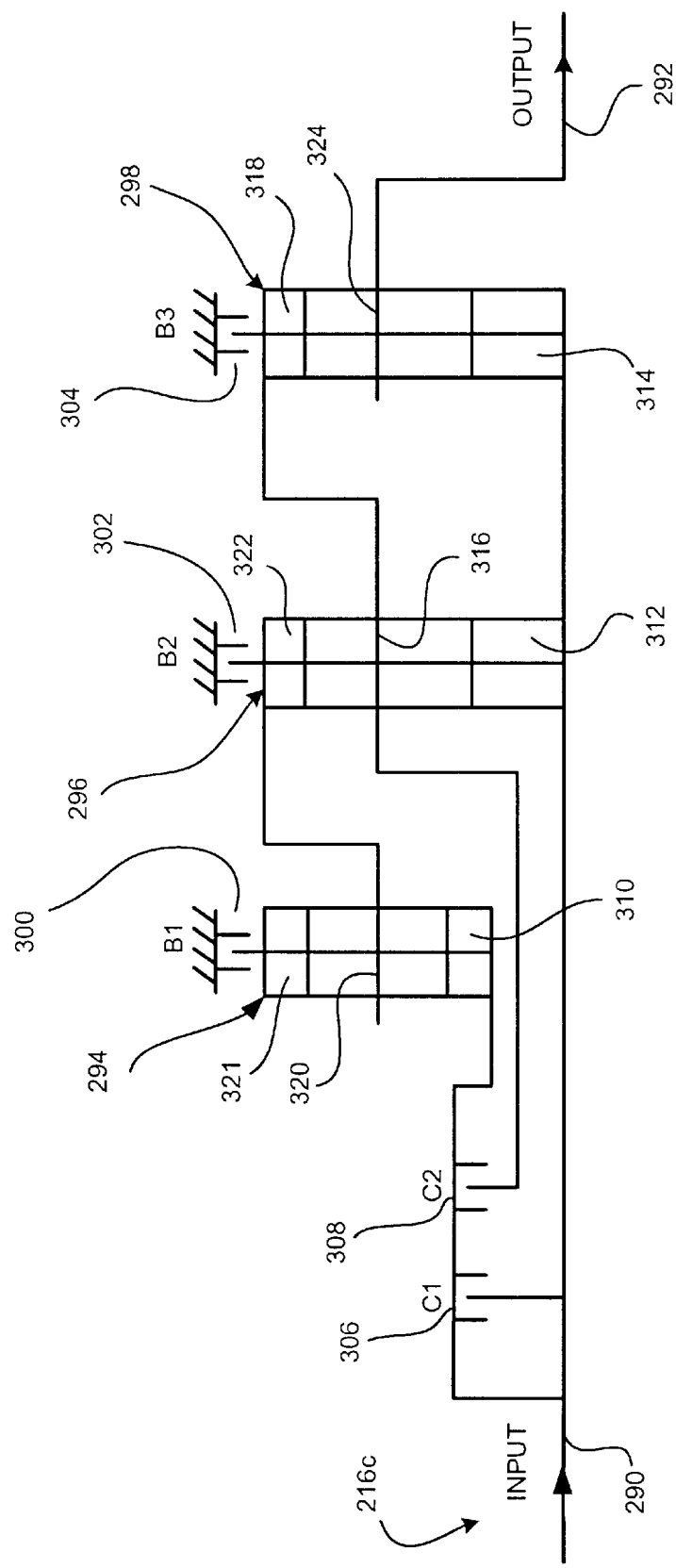
FIG. 9 is a schematic view of a six-speed transmission embodying multiple split planetary gear assemblies according to the principles of the present invention.

With reference to FIG. 9, a third preferred embodiment of transmission 216, referenced as transmission 216c is shown. Transmission 216c provides six (6) forward drive ratios, a reverse ratio and comprises an input shaft 290, an output shaft 292, a first planetary gear assembly 294, a second planetary gear assembly 296 and a third planetary gear assembly 298, a first brake 300, a second brake 302 and a third brake 304 and a first clutch 306 and a second clutch 308. First, second and third planetary gear assemblies 294, 296, 298 are of the split-helical, load sharing, anti-phasing type (described above). Input shaft 290 is coupled with a sun gear 310 of first planetary gear assembly 294 for driving sun gear 310. First clutch 306 enables selective coupling of input shaft 290 to both sun gear 312 of second planetary gear assembly 296 and sun gear 314 of third planetary gear assembly 298, for driving both sun gears 312 and 314. Second clutch 308 enables selective coupling of input shaft 290 to a carrier 316 of second planetary gear assembly 296, for driving carrier 316. In turn, carrier 316 is coupled to ring gear 318 of third planetary gear assembly 298 and is also driven by input shaft 290 when second clutch 308 is engaged. A carrier 320 of first planetary gear assembly 294 is coupled for rotation with ring gear 322 of second planetary gear assembly 296. First, second and third brakes 300, 302 and 304 are respectively associated with ring gears 321, 322 and 318 of first, second and third planetary gear assemblies 294, 296 and 298 for selectively braking each ring gear 318, 321 and 322. A carrier 324 of third planetary gear assembly 298 is coupled to output shaft 292, for driving output shaft 292.

As described previously, various combinations of clutches and brakes are engaged for establishing six (6) forward drive ratios and a reverse ratio. With particular reference to Table 3 below, the various gear ratios and clutch/brake combinations for establishing the gear ratios are defined. A first forward drive ratio is established by engagement of first clutch (C1) 306 and third brake (B3) 304. Engagement of first clutch (C1) 306 and second brake (B2) 302 achieves a second forward drive ratio. A third forward drive ratio is achieved by engagement of first clutch (C1) 306 and first brake (B1) 300. A fourth forward drive ratio is established by engagement of first and second clutches (C1, C2) 306 and 308. Engagement of second clutch (C2) 308 and first brake (B1) achieves a fifth forward drive ratio. A sixth forward drive ratio is established by engaging second clutch (C2) 308 and second brake (B2) 302. A reverse drive ratio is established by engaging first and third brakes (B1, B3) 302 and 304.

TABLE 3

| Ratio | C1 | C2 | B1 | B2 | B3 |
|---|---|---|---|---|---|
| 1 | X |   |   |   | X |
| 2 | X |   |   | X |   |
| 3 | X |   | X |   |   |
| 4 | X | X |   |   |   |
| 5 |   | X | X |   |   |
| 6 |   | X |   | X |   |
| R |   |   | X |   | X |

Figure 10:
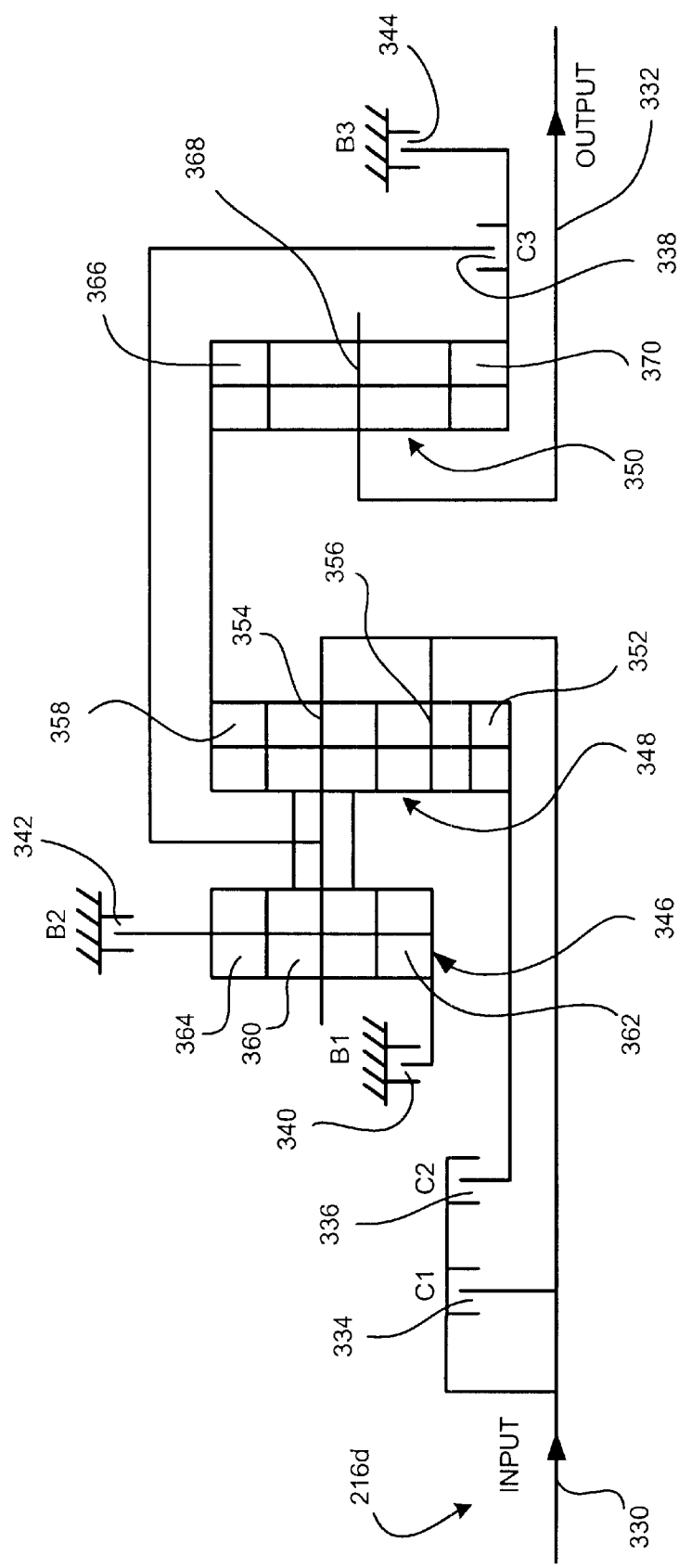
FIG. 10 is a schematic view of a five-speed transmission embodying multiple split planetary gear assemblies according to the principles of the present invention.

With reference to FIG. 10, a fourth preferred embodiment of transmission 216, noted as transmission 216d, is detailed. Transmission 216d provides five (5) forward drive ratios and a reverse ratio and comprises an input shaft, 330, an output shaft 332, a first clutch 334, a second clutch 336 and a third clutch 338, a first brake 340, a second brake 342 and a third brake 344 and a first planetary gear assembly 346, a second planetary gear assembly 348 and a third planetary gear assembly 350. First, second and third planetary gear assemblies 346, 348 and 350 are of the split-helical, load sharing, anti-phasing type and will not be described in detail. Second planetary gear assembly has first and second carriers 354 and 356. This is unique from first and third planetary gear assemblies 346 and 350 which each have a single carrier. Planetary gear assemblies having dual carriers result in the sun gear and ring gear rotating in a common direction about a common axis. Input shaft 330 is selectively coupleable to either a sun gear 352 or first and second carriers 354 and 356. First brake 340 can be selectively engaged to brake sun gear 362 of first planetary gear assembly 346, prohibiting rotation of sun gear 362. Second brake 342 can be selectively engaged to brake ring gear 364 of first planetary gear assembly 346, prohibiting rotation of ring gear 364. Ring gear 358 of second planetary gear assembly 348 is fixed for rotation with ring gear 366 of third planetary gear assembly 350. A carrier 368 of third planetary gear assembly 350 is coupled to output shaft 332 for driving output shaft 332. Third brake 344 can be selectively engaged to brake sun gear 370 of third planetary gear assembly 350, prohibiting rotation of sun gear 370.

TABLE 4

| Ratio | C1 | C2 | C3 | B1 | B2 | B3 |
|---|---|---|---|---|---|---|
| 1 |   | X | X |   |   | X |
| 2 |   | X |   | X |   | X |
| 3 | X | X |   |   |   | X |
| 4 | X | X | X |   |   |   |
| 5 | X |   | X | X |   |   |
| R |   | X | X |   | X |   |

As described previously, various combinations of clutches and brakes are engaged for establishing five (5) forward drive ratios and a reverse ratio. With particular reference to Table 4 above, the various gear ratios and clutch/brake combinations for establishing the gear ratios are defined. First gear is established by engaging second and third clutches (C2, C3) 336 and 338 and third brake (B3) 344. Engagement of second clutch (C2) 336 and first and third brakes (B1, B3) 340 and 344 achieves second gear. Third gear is achieved through engagement of first and second clutches (C1, C2) 334 and 336 and third brake (B3) 344. Engagement of first, second and third clutches (C1, C2, C3) 334, 336 and 338 establishes fourth gear. Fifth gear is established by engagement of first and third clutches (C1, C3) 334 and 338 and first brake (B1) 340. Finally, reverse is achieved by engaging second and third clutches (C2, C3) 336 and 338 and second brake (B2) 342.

Figure 11:
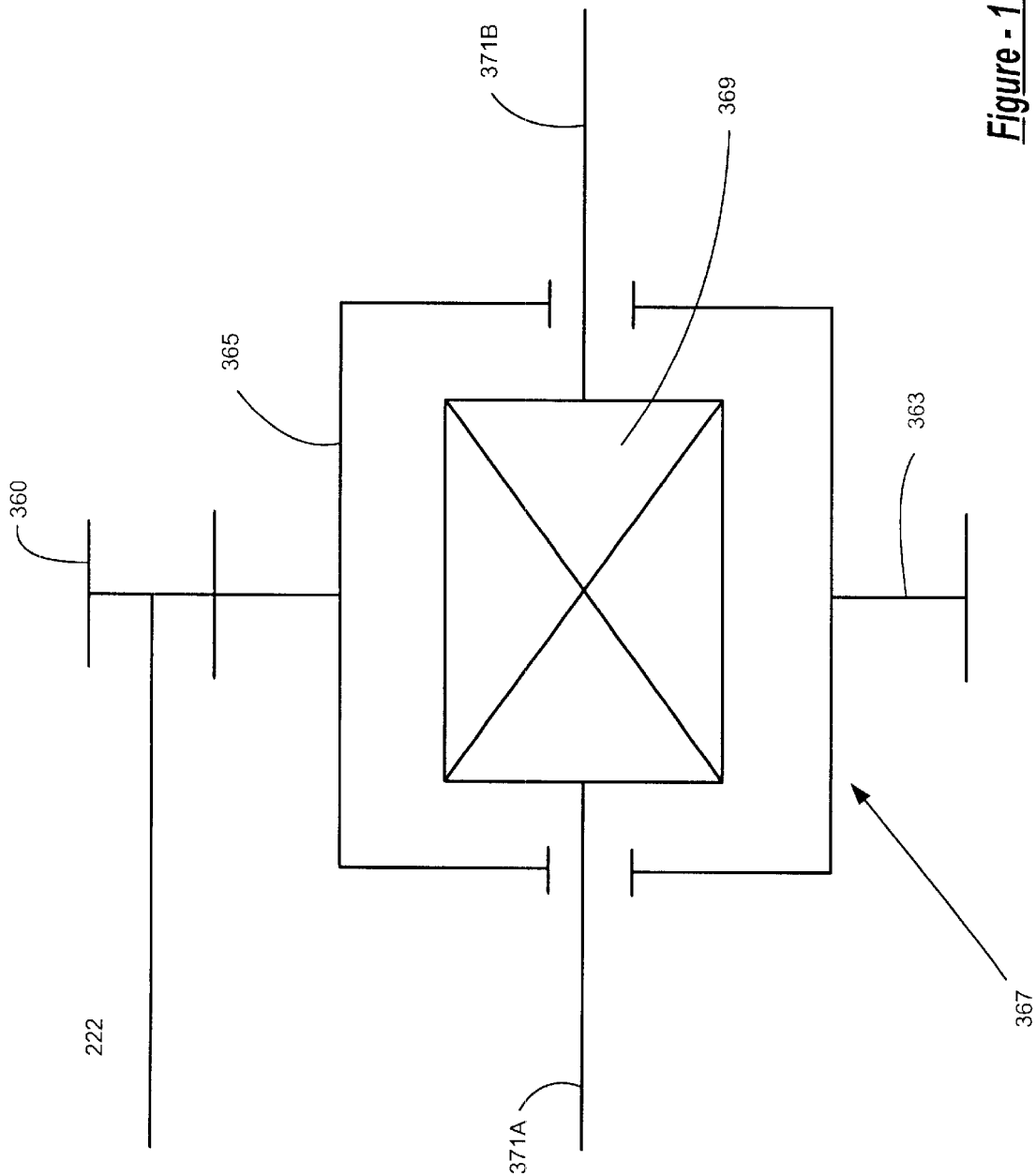
FIG. 11 is a schematic view of a transmission embodying multiple split planets gear assemblies according to the principles of the present invention in a front-wheel drive application.

Each of the various transmissions shown in FIGS. 7 through 10 illustrate an output shaft which in rear-wheel drive applications would be connected to differential 218 via rear propshaft 217 (FIG. 6). To clearly reflect that each transmission could likewise be used in front-wheel drive applications, FIG. 11 schematically illustrates output shaft 222 (or output shafts 262, 292 and 332) driving a pinion 360 which, in turn, is driving a ring gear 363 fixed to a drive carrier 365 of a differential 367. Differential 367 is of the type installed in transaxles with a gearset 369 connecting carrier 365 to front axle shafts 371A and 371B.

Figure 12:
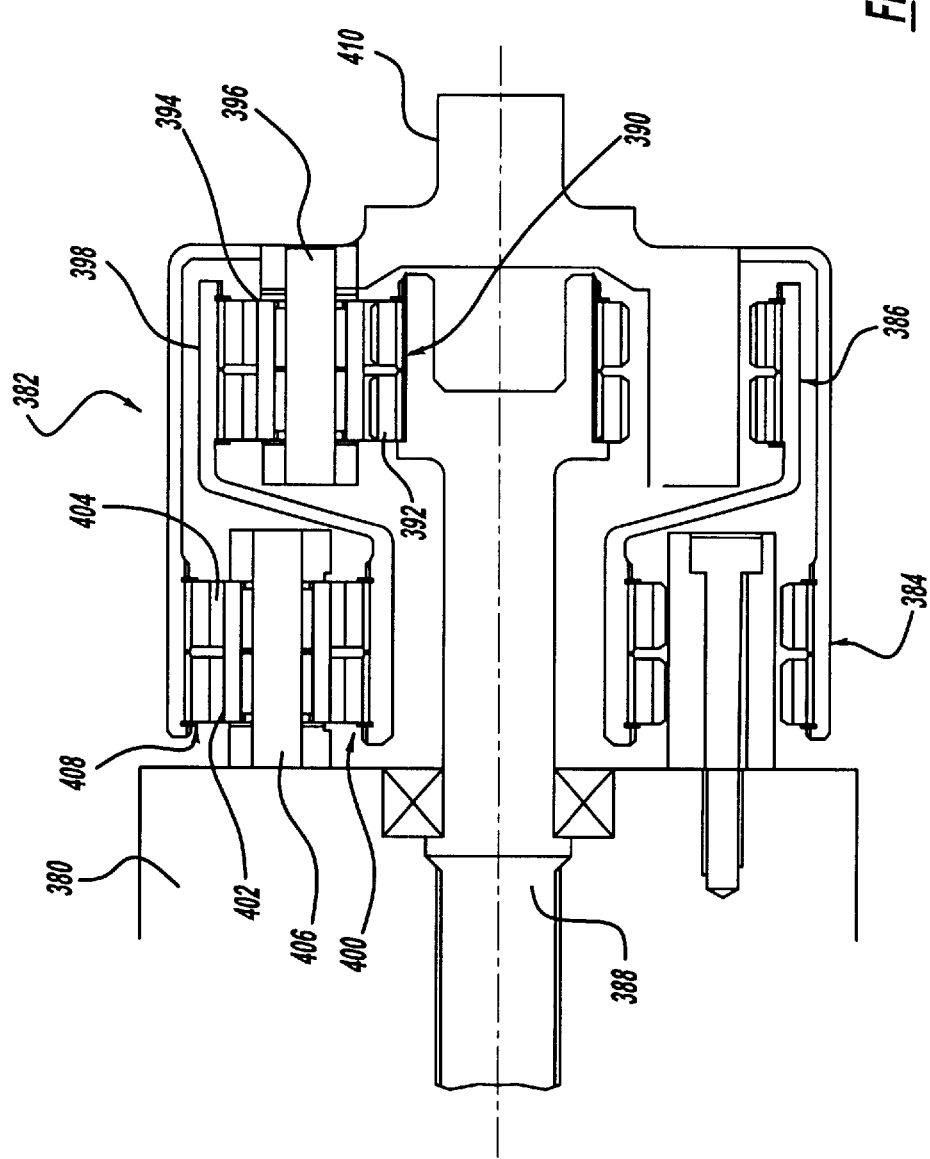
FIG. 12 is a schematic view of a gear reduction unit for an electric or hybrid vehicle embodying multiple split planetary gear assemblies according to the principles of the present invention.

It is also an object of the present invention to provide an improved gear reduction unit for implementation with electric or hybrid vehicles. With reference to FIG. 12 an electric motor/generator 380 is shown having a gear reduction unit 382 attached thereto. Gear reduction unit 382 comprises first and second planetary gear assemblies 384 and 386. First and second planetary gear assemblies 384 and 386 implement load sharing and anti-phasing technology as described previously. Because first and second planetary gear assemblies 384 and 386 are equivalent in construction to those previously described, further detail is not required.

Electric motor 380 includes an output shaft 388. Output shaft 388 is coupled to sun gear 390 of second planetary gear assembly 386 for driving sun gear 390. Sun gear 390 drives first and second pinion gears 392 and 394 of second planetary gear assembly 386, and are rotatably supported by a carrier 396. Second planetary gear assembly 386 also includes ring gear 398 driven by first and second pinion gears 392 and 394. A sun gear 400 of first planetary gear assembly 384 is coupled for rotation with ring gear 398. Sun gear 400 drives third and fourth pinion gears 402 and 404 which are rotatably supported by a carrier 406. Carrier 406 is fixedly attached to electric motor/generator 380 such that it is prohibited from rotation. Third and fourth pinion gears 402 and 404 drives ring gear 408 of first planetary assembly 384. Gear reduction unit 382 has an output shaft 410 adapted to drive a vehicle (not shown). Output shaft 410 is coupled for rotation with ring gear 408 and carrier 396. Constructed as such, gear reduction unit 382 provides a significant reduction ratio for use in an electric or hybrid vehicle. The preferred embodiment of the present invention provides an 11.6:1 reduction ratio.

Although the present invention has been described in association with a gear reduction unit for a transmission, this is to be considered as merely exemplary. As such, the split helical planetary gear assembly of the present invention is readily adaptable for use in other vehicular and non-vehicular applications where similar operating characteristics are desired. Accordingly, the foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A transmission, comprising:
   an input shaft;
   an output shaft;
   a first planetary gear assembly selectively in mechanical communication with said input and output shafts, said first planetary gear assembly including:
     a first gearset having gear components with helical gear teeth comprising a first sun gear, a first ring gear and a first planet gear rotatably supported on a carrier component and meshed with at least one of said first sun gear and said first ring gear;
     a second gearset having gear components with helical gear teeth comprising a second sun gear fixed for rotation with said first sun gear, a second ring gear and a second planet gear rotatably supported on said carrier component and meshed with at least one of said second sun gear and said second ring gear, said gear components of said second gearset having an equal number of helical teeth with an equivalent helix angle and tooth pitch as said gear components of said first gearset, and wherein said gear components of said second gearset arranged to have opposite helix inclination and are circumferentially indexed by one-half tooth pitch relative to corresponding gear components of said first gearset; and
   a second planetary gear assembly in mechanical communication with said first planetary gear assembly and said output shaft, said second planetary gear assembly including a third gearset having gear components with helical gear teeth comprising a third sun gear selectively rotatable with a component of said first planetary gear assembly, a third ring gear and a third planet gear rotatably supported on a second carrier component and meshed with at least one of said third sun gear and said third ring gear and a fourth gearset having gear components with helical gear teeth comprising a fourth sun gear fixed for rotation with said third sun gear, a fourth ring gear and a fourth planet gear rotatably supported on said second carrier component and meshed with at least one of said fourth sun gear and said fourth ring gear, said gear components of said fourth gearset having an equal number of helical teeth with an equivalent helix angle and tooth pitch as said gear components of said third gearset, and wherein said gear components of said fourth gearset are arranged to have opposite helix inclination and are circumferentially indexed by one-half tooth pitch relative to corresponding gear components of said third gearset.

2. The transmission of claim 1 further comprising at least one clutch for selectively coupling said planetary gear assembly for rotation with said input shaft.

3. The transmission of claim 1 further comprising at least one brake for selectively braking one of said components of said planetary gear assembly.

4. The transmission of claim 1 further comprising a clutch for selectively coupling one of said components of said first planetary gear assembly for rotation with said input shaft.

5. The transmission of claim 1 further comprising a brake for selectively braking one of said components of said first planetary gear assembly.

6. The transmission of claim 1 further comprising a clutch for selectively coupling one of said components of said second planetary gear assembly for rotation with said input shaft.

7. The transmission of claim 1 further comprising a brake for selectively braking one of said components of said second planetary gear assembly.

8. The transmission of claim 1 further comprising a third planetary gear assembly in mechanical communication with said first and second planetary gear assemblies and said output shaft, said third planetary gear assembly including:
   a fifth gearset having gear components with helical gear teeth comprising a fifth sun gear selectively rotatable with said input shaft, a fifth ring gear and a fifth planet gear rotatably supported on a third carrier component and meshed with at least one of said fifth sun gear and said fifth ring gear; and
   a sixth gearset having gear components with helical gear teeth comprising a sixth sun gear fixed for rotation with said fifth sun gear, a sixth ring gear and a sixth planet gear rotatably supported on said third carrier component and meshed with at least one of said sixth sun gear and said sixth ring gear, said gear components of said sixth gearset having an equal number of helical teeth with an equivalent helix angle and tooth pitch as said gear components of said fifth gearset, and wherein said gear components of said sixth gearset are arranged to have opposite helix inclination and are circumferentially indexed by one-half tooth pitch relative to corresponding gear components of said fifth gearset.

9. The transmission of claim 8 further comprising at least one clutch for selectively coupling one of said components of said first, second and third planetary gear assemblies for rotation with said input shaft.

10. The transmission of claim 8 further comprising a brake for selectively braking one of said components of said first planetary gear assembly.

11. The transmission of claim 8 further comprising a brake for selectively braking one of said components of said second planetary gear assembly.

12. The transmission of claim 8 further comprising a brake for selectively braking one of said components of said third planetary gear assembly.

13. The transmission of claim 9 further comprising a second clutch for selectively coupling one of said components of said second and third planetary gear assemblies for rotation with said input shaft.

14. A gear reduction unit for use with an electric vehicle, said gear reduction unit comprising:

first and second planetary gear assemblies wherein each of said first and second planetary gear assemblies includes;

a first gearset having gear components with helical gear teeth comprising a first sun gear, a first ring gear and a first planet gear rotatably supported on a carrier and meshed with said first sun gear and said first ring gear; and a second gearset having gear components with helical gear teeth comprising a second sun gear fixed for rotation with said first sun gear, a second ring gear and a second planet gear rotatably supported on said carrier and meshed with said second sun gear and said second ring gear, said gear components of said second gearset having an equal number of helical teeth with an equivalent helix angle and tooth pitch as said gear components of said first gearset, and wherein said gear components of said second gearset are arranged to have opposite helix inclination and are circumferentially indexed by one-half tooth pitch relative to corresponding gear components of said first gearset;

wherein said first and second sun gears of said first planetary gear assembly are fixed for rotation with an input shaft and said first and second sun gears of said second planetary gear assembly are fixed for rotation with said first and second ring gears of said first planetary gear assembly; and wherein said first and second ring gears of said second planetary gear assembly are fixed for rotation with an output shaft.

15. The gear reduction unit of claim 14 wherein said carrier of said first planetary gear assembly is connected for rotation with said output shaft.

16. The gear reduction unit of claim 14 wherein said carrier of said second planetary gear assembly is prohibited from rotating.

\* \* \* \* \*